US012555666B2

(12) United States Patent
Chen et al.

(10) Patent No.: US 12,555,666 B2
(45) Date of Patent: Feb. 17, 2026

(54) MACHINE LEARNING-BASED EXERCISE RECOMMENDATION ADJUSTMENT BASED ON USER FEEDBACK

(71) Applicant: FITBOD, INC., San Francisco, CA (US)

(72) Inventors: Allen Chen, San Francisco, CA (US); Jesse Dominic Venticinque, Woodside, CA (US); Magdalena Mellema-Morgan, Vancouver (CA)

(73) Assignee: FITBOD, INC., San Francisco, CA (US)

( * ) Notice: Subject to any disclaimer, the term of this patent is extended or adjusted under 35 U.S.C. 154(b) by 134 days.

(21) Appl. No.: 18/181,479

(22) Filed: Mar. 9, 2023

(65) Prior Publication Data

US 2024/0304300 A1 Sep. 12, 2024

(51) Int. Cl.
*G16H 20/30* (2018.01)
*G06N 20/00* (2019.01)

(52) U.S. Cl.
CPC ............. *G16H 20/30* (2018.01); *G06N 20/00* (2019.01)

(58) Field of Classification Search
None
See application file for complete search history.

(56) References Cited

U.S. PATENT DOCUMENTS

| | | | |
|---|---|---|---|
| 9,474,934 B1* | 10/2016 | Krueger | A61B 5/4872 |
| 2014/0280219 A1* | 9/2014 | Maser | G11B 27/034 |
| | | | 707/748 |
| 2022/0314074 A1* | 10/2022 | Bissonnette | A63B 24/0062 |

OTHER PUBLICATIONS

Ishraque et al. ("Artificial Intelligence-Based Cardiac Rehabilitation Therapy Exercise Recommendation System," 2018 IEEE MIT Undergraduate Research Technology Conference (URTC), Cambridge, MA, USA, 2018, pp. 1-5) (Year: 2018).*
youtube.com, "Fitbod—The Best Fitness & Gym App Review," uploaded by Josh Marriott—Real Estate Training, Dec. 2, 2018, 1 page, Retrieved from the internet <URL:https://www.youtube.com/watch?v=Z45zl8FFhgA>.

(Continued)

*Primary Examiner* — Christopher B Tokarczyk
(74) *Attorney, Agent, or Firm* — Fenwick & West LLP

(57) ABSTRACT

An exercise recommendation system determines workout plans for users. The exercise recommendation system trains a machine-learned model configured to rank a set of exercises, and the ranking of exercises can be modified based on feedback from a user, for instance requesting that an exercise be recommended more frequently, less frequently, or never. The exercise recommendation system can also implement a machine-learned model configured to predict a measure of strength for the user, and can, in response to determining that the measure of strength of the user has decreased or plateaued over time, modify a workout for a user based on a muscle or muscle group associated with the measure of strength. Likewise, the exercise recommendation system can modify a workout in response to a predicted measure of strength being less than an actual measure of strength, for instance to include exercises targeting muscles associated with the measure of strength.

19 Claims, 10 Drawing Sheets

(56) References Cited

OTHER PUBLICATIONS youtube.com, "Fitbod Review | A Dive Into the Best Fitness App Yet," uploaded by TechnoFlux, Mar. 2, 2019, 1 page, Retrieved from the internet <URL:https://www.youtube.com/watch?v=NgSd8sdv0Sg>.

youtube.com, "Fitbod Demo," uploaded by allenchen4783, Nov. 13, 2015, 1 page, Retrieved from the internet <URL:https://www.youtube.com/shorts/0m9g82O2ubA>.

youtube.com, "E730: Launch Incubator PT1: Transported: Real Estate VR & FitBod: Machine learning strength-training," uploaded by This Week in Startups, May 5, 2017, 1 page, Retrieved from the internet <URL:https://www.youtube.com/watch?v=2yjamisdBVg>.

youtube.com, "Fitbod Fitness App Review (An AI Personal Trainer, Sort Of)," uploaded by Average Dad Reviews Fitness, Jan. 11, 2021, 1 page, Retrieved from the internet <URL:https://www.youtube.com/watch?v=xag1Y0E-NCU>.

\* cited by examiner

System Environment
100

MACHINE LEARNING-BASED EXERCISE RECOMMENDATION ADJUSTMENT BASED ON USER FEEDBACK

BACKGROUND

This invention relates generally to determining a workout plan for a user and, more particularly, to using machine learning to modify workouts and exercises, and to predict current and future measures of strength for users.

When working out, users may follow different workout plans from one another. For example, one user may want to focus on arm exercises one day and leg exercises the next day with a goal to strengthen their muscles each day. In another example, a user may prefer that the exercises in their workout be the same every week. Other users may prefer to perform a greater variety of exercises when working out. However, current systems do not allow a user to specify how they would like variety in their workout while accounting for the user's goals and other preferences in determining a workout for the user.

Further, some users may want to increase their capabilities when they work out. Increased capability may be measured by an increasing amount of weight used or an increasing number of repetitions performed for an exercise over time. However, current systems lack the ability to predict a user's future strength in one or more muscle groups, to identify trends in measures of the user's strength, and to modify workout or exercise recommendations based on future strength predictions and strength trends.

SUMMARY

The following disclosure describes an exercise recommendation system that selects exercises for a user to perform. In particular, the exercise recommendation system receives a profile of a user and a level of variance selected by the user. The profile may include a history of exercises the user has performed, available gym equipment, and one or more exercise goals. The exercise recommendation system inputs the profile of the user to an exercise selection model, which is configured to rank a set of exercises for a user to perform based on the history of exercises the user has performed, the available gym equipment, and the one or more exercise goals. The user may wish to modify recommended workouts from the exercise recommendation system to fit their preferences. The exercise recommendation system provides instructions to the user to perform a workout including a set of exercises selected, at least in part, on the ranked set of exercises. In response to the workout, the user provides feedback indicating a preference for one or more of the exercises within the workout. The exercise recommendation system then modifies the ranking of exercises in response to the feedback. A second workout with a second set of exercises is generated by the exercise recommendation system based on the modified ranking of exercises.

In addition to generating workouts, the exercise recommendation system may generate a prediction for a measure of strength of the user. The strength prediction is based on the user's characteristics and data describing the user's performance of one or more exercises. The exercise recommendation system can identify, using a machine learning model, that the predicted measure of strength for a user has plateaued or decreased over time. In such cases, the exercise recommendation system modifies a recommended workout for the user based on a muscle or muscle group associated with the predicted measure of strength. The modified recommendation is tailored to increase the predicted measure of strength.

The exercise prediction system may additionally train a machine learning model using information describing characteristics and strength data for a population of historical users. The information includes measures of strength for historical users over time. The trained machine learning model predicts a future measure of strength for a user based on the user's characteristics. As the user performs workouts, an actual measure of strength for the user is determined and projected over time. The exercise prediction system may determine that the actual measure of strength at a future time is less than the predicted measure of strength from the machine learning model for that future time. In response, the exercise prediction system modifies a workout for the target user based on a muscle or muscle group associated with the predicted measure of strength. By modifying the workout to focus on a muscle or muscle group, the actual measure of strength projection may be brought to align with the predicted measure of strength.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
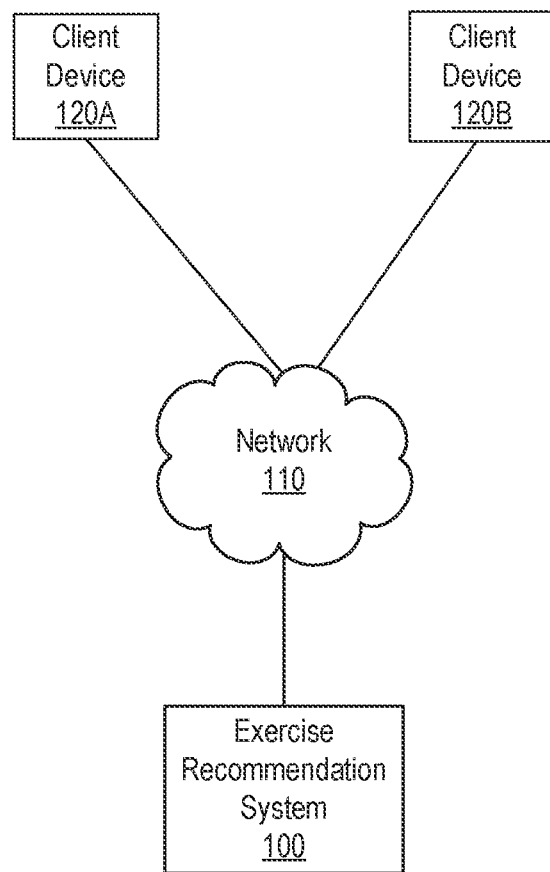
FIG. 1 illustrates a system environment for an exercise recommendation system, according to one embodiment.

FIG. 1 illustrates a system environment for an exercise recommendation system 100, according to one embodiment.

The exercise recommendation system 100 is connected to a number of client devices 120 used by users of the exercise recommendation system 100 via a network 110. These various components are now described in additional detail.

The client devices 120 are computing devices such as smart phones, laptop computers, desktop computers, or any other device that can communicate with the exercise recommendation system 100 via the network 110. The client devices 120 may provide a number of applications, which may require user authentication before a user can use the applications, and the client devices 120 may interact with the exercise recommendation system 100 via an application. Though two client devices 120 are shown in FIG. 1, any number of client devices 120 may be connected to the exercise recommendation system 100 in other embodiments.

Figure 2:
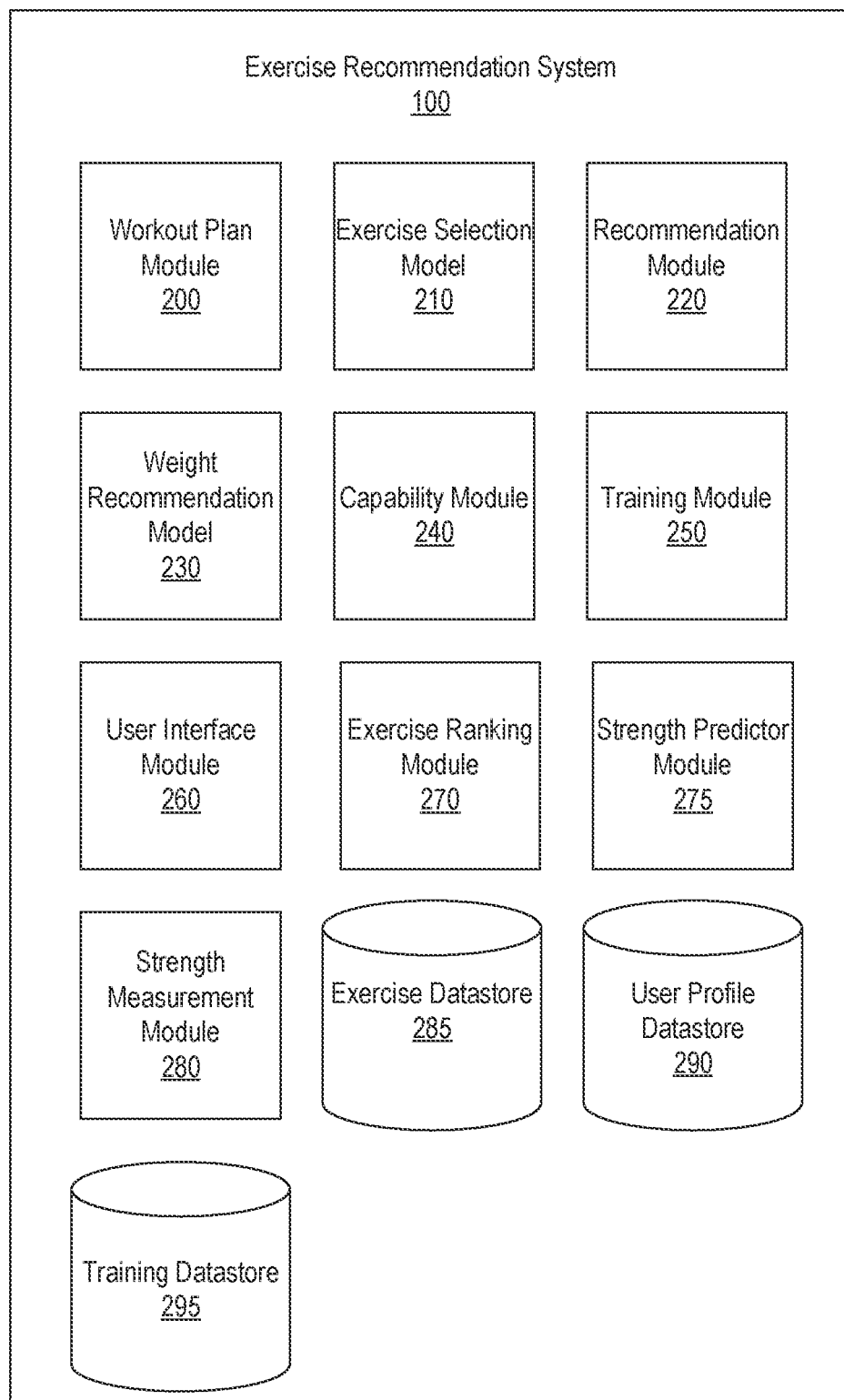
FIG. 2 is a high-level block diagram of an exercise recommendation system, according to one embodiment.

The network 110 connects the client devices 120 to the exercise recommendation system 100, which is further described in relation to FIG. 2. The network 110 may be any suitable communications network for data transmission. In an embodiment such as that illustrated in FIG. 1, the network 110 uses standard communications technologies and/or protocols and can include the Internet. In another embodiment, the network 110 uses custom and/or dedicated data communications technologies.

FIG. 2 is a high-level block diagram of an exercise recommendation system 100, according to one embodiment. The exercise recommendation system 100 operates in real-time to determine exercises, target weights, target repetitions, capabilities, and the like for users. The exercise recommendation system 100 includes a workout plan module 200, an exercise selection model 210, a recommendation module 220, a weight recommendation model 230, a capability module 240, a training module 250, a user interface module 260, an exercise ranking module 270, a strength predictor module 275, a strength measurement module 280, an exercise datastore 285, a user profile datastore 290, and a training datastore 295. In some embodiments, the exercise recommendation system 100 may include more modules or models than shown in FIG. 2 or one or more of the modules and models shown in FIG. 2 may be combined within the exercise recommendation system 100.

The workout plan module 200 determines workout plans for users. A workout plan includes one or more exercises for a user to complete during a workout (e.g., a continuous time period during which a user performs exercises). An exercise is an activity that a user performs to improve their physical fitness, and exercises are stored in the exercise datastore. Examples of exercises may include squats, leg lifts, jumping jacks, and the like. Each exercise is associated with exercise information, which may include an exercise type (e.g., cardio, bodyweight, weighted, warm-up, timed intervals, etc.), a list of users who have performed the exercise, and exercise requirements. Exercise requirements describe equipment needed to perform an exercise or physical ailments that may preclude a user from performing the exercise. Exercises and exercise information is stored in the exercise datastore 285.

The workout plan module 200 receives a request for a workout plan from the user interface module 260. The request can include a level of variance selected by the user via a user interface, as described in relation to the user interface module 260 below. The level of variance represents how much variety in exercise type, exercise, workout length, and focused muscle group the user would like in a workout. For instance, a high level of variance (e.g., 80%) indicates that a user prefers to perform a variety of exercises each workout whereas a low level of variance (e.g., 25%) indicates that a user prefers to perform the same exercises each workout. In some embodiments, the workout plan module 200 may use a default level of variance as the selected level of variance if the user has not explicitly selected a level of variance via the request. In other embodiments, the workout plan module 200 may specify a level of variance of the user based on a history of exercises performed by the user stored in the user profile datastore 290, as described below. For example, if the user has performed a certain number of workouts or number of exercises, the workout plan module 200 may automatically adjust the level of variance to correspond to the user's history.

The workout plan module 200 retrieves a profile of the user from the user profile datastore 290. The user profile datastore 290 stores profiles of users, where each profile includes a current height, weight (which may be stored in pounds or kilograms), age, muscle mass, and level of fitness experience (e.g., beginner, intermediate, advanced, etc.) of a user. The profile may also include historical weights of the user, historical muscle masses of the user, gym equipment available to the user, one or more exercise goals selected by the user (e.g., number of calories to burn, desired weight, desired muscle mass, desired strength per exercise, desired type, format, or style of workout, etc.), ratings of exercises previously performed by the user, one or more muscle groups the user would like to target during workouts, and any exercise restrictions indicated by the user (e.g., the user has knee issues and cannot squat), and an exercise history of exercises previously performed by the user during one or more workouts. Each exercise in the exercise history may be associated with performance statistics of the user when the user completed the exercise and a recency (e.g., how recently the exercise was performed by the user). For instance, the performance statistics may include a weight the user used for the exercise (stored as pounds or kilograms), a number of sets the user completed of the exercise, a number of repetitions per set the user completed for the exercise, and a time to complete the exercise. The performance statistics may also include the user's current weight and muscle mass. Further, the exercise history may be associated with an exercise list for the user which includes exercises that match the user's profile (e.g., exercises that the user has equipment and ability to perform). The exercise list may alternatively be stored in the exercise datastore 285.

Each profile may also include a capability of a user. The capability is a maximum amount of weight that the user can use to do one repetition of an exercise. For example, the user's capability may be 150 pounds of weight doing one bench-press. In some embodiments, capability may include weight capability and repetition capability for a particular exercise (e.g., bench-press). A repetition capability may be a maximum number of repetitions the user can do of the exercise in a single set. For example, the user's weight capability may be using 150 pounds of weight to do one bench-press, and the user's repetition capability may be doing 20 bench-presses with 50 pounds of weight. In some embodiments, the repetition capability may be only used for bodyweight exercises that do not require the user to use extra weight, or a number of a weighted exercise in a set using a base weight. The capability (e.g., weight capability and repetition capability) of the user for an exercise may be stored in the exercise datastore 285 in association with the exercise in the user's exercise list. The capability module 240 may update the capability of the user for each exercise as the user completes exercises, as further described below.

The workout plan module 200 inputs the profile of the user to the exercise selection model 210. The exercise selection model 210 is a machine learning model configured to rank a set of exercises for a user to perform based on a profile of the user, including the exercise history that the user has performed (e.g., as stored in for the user's profile), gym equipment available to the user, and one or more exercise goals. The exercise selection model 210 may also be configured to rank the exercises based on exercise metadata stored in the exercise datastore 285. The exercise metadata may include a score for each exercise indicating an efficacy of the exercise and/or whether the exercise targets primary muscle groups (e.g., quadriceps, shoulders, back, etc.) or accessory muscle groups (e.g., abductors, forearms, calves, etc.). The exercise selection model 210 may be a classifier, decision tree, regression model, neural network, random forest model, or the like. In some embodiments, the exercise selection model 210 may be a statistical model. The exercise selection model 210 is trained by the training module 250, as described below.

The workout plan module 200 receives scores of exercises in the exercise datastore 285 from the exercise selection model 210. Based on the scores, the workout plan module 200 forms a ranking of the exercises. In some embodiments, the workout plan module 200 may store an exercise list specific to each user, such that the exercise selection model 210 may score and rank the exercises from the user's exercise list. In these embodiments, the exercise list may include exercises that the user has equipment for or exercises that align with the exercise goals set by the user. The workout plan module 200 adjusts the ranking based on the profile of the user who submitted the request. For example, if the user's profile indicates that the user has a goal to improve their quad strength, the workout plan module 200 may boost scores for exercises that focus on strengthening quads by 1.5 times (or another multiplicative factor). In another example, if the user's profile indicates that they do not own dumbbells, the workout plan module 200 may reduce the scores of exercises that require dumbbells to zero or remove the exercises from the ranking.

The workout plan module 200 may also adjust the scores in the ranking based on a given user's selected level of variance. In some embodiments, the workout plan module 200 may alter the ranking of exercises completed by the user within a threshold amount of time by the selected level of variance. For example, for a selected level of variance of 50%, the workout plan module 200 may randomly select 50% of the exercises the user most recently performed (e.g., within a threshold amount of item) and increase their rankings by 5 places. The workout plan module 200 may additionally decrease the rankings of the other 50% of exercises most recently performed by 5 places. The workout plan module 200 may reduce the scores of exercises recently performed by the user, exercises with low ratings by the user (e.g., on a scale from 1 to 5, a 3 or less), or exercises that require equipment the user does not have by a set amount (e.g., subtracting one from each score) or to zero. Alternatively, the workout plan module 200 may reduce the scores of exercises that the user does not have equipment for to zero or may alter the score by the level of variance (e.g., multiplying a subset of the scores by the level of variance).

The workout plan module 200 selects one or more of the exercises for the user's workout plan based on the ranking. For instance, the workout plan module 200 may select the top ten ranked (or another threshold number of) exercises from the exercise list and send those to the user interface module 260 for display to the user as the user's workout plan. In some embodiments, the workout plan module 200 may select the top-ranked exercise to send to the user interface module 260 for display to the user and may use the exercise selection model 210 to re-score and re-rank the exercises from the exercise list to select a next exercise for the user to perform upon receiving an indication from the user interface module 260. The workout plan module 200 may repeat this process until the workout plan module 200 has selected a threshold number of exercises for the user to perform. In other embodiments, the workout plan module 200 may select the top-ranked exercise and subsequently use the exercise selection model 210 to re-score and re-rank the exercises from the exercise list to select a next exercise. The workout plan module 200 may repeat this process of re-scoring, re-ranking, and selecting until the workout plan module 200 has selected a threshold number of exercises for the workout plan, which the workout plan module 200 sends to the user interface module 260 to display to the user as the workout plan.

Further, in some embodiments, the workout plan module 200 selects a subset of exercises to send for the workout plan based on the level of variance. For instance, the workout plan module 200 may select more exercises for a high level of variance than for a low level of variance. In these embodiments, the workout plan module 200 may randomly select exercises from the subset to send to the user interface module 260 for the workout plan upon receiving a request from the user interface module 260. Thus, the user may see a greater variety of exercises for a higher level of variance than a lower level of variance.

For each selected exercise, the workout plan module 200 requests a recommended weight, number of repetitions, and number of sets (henceforth referred to collectively as recommendations) from the recommendation module 220. For example, the exercise "bicep curls" may be associated with a weight of 15 pounds per arm, 10 curls, and 3 sets for the user's workout plan. To complete the exercise, the user could use 15-pound dumbbells to do 10 bicep curls on each arm 3 times. The recommendation module 220 may determine a weight, number of repetitions, and number of sets to recommend to the user based on the user's performance statistics.

The recommendation module 220 may receive a request for one or more of the recommendations for a user and an exercise from the workout plan module 200. Alternatively, the recommendation module 200 may receive a request for the one or more recommendations and the exercise from the user interface module 260. The recommendation module 220 retrieves performance statistics of the user who submitted the request from the user profile datastore 290 and uses the performance statistics to determine recommendations for the user. In some embodiments, if the user has previously performed the exercise, the recommendation module 220 may base the recommendations on the most recent performance statistics related to the exercise in the exercise history. In other embodiments, if the user has not performed the exercise, the recommendation module 220 may apply a ratio based on an exercise pair including the exercise and an exercise the user has performed to determine recommendations. Alternatively, the recommendation module 220 requests a capability of the user from the capability module 240, which is described below, and use the capability of the user to determine recommendations for the user.

Further, the recommendation module 220 may input the performance statistics of the user to the weight recommendation model 230 to determine the recommendations. The weight recommendation model 230 is a machine learning model configured to determine a weight to recommend to a use for an exercise based on performance statistics of the user associated with other exercises. The weight recommendation model 230 may additionally receive the exercise as an input or may output a weight for each exercise in the exercise datastore 285. In some embodiments, the weight recommendation model 230 may also determine the number of repetitions and number of sets of the exercise to recommend to the user. The weight recommendation model 230 may be a classifier, decision tree, regression model, neural network, random forest model, or the like. The weight recommendation model 210 is trained by the training module 250, as described below.

In some embodiments, the recommendation model 220 receives recommendations directly from the weight recommendation model 230. In some embodiments, the recommendation module 220 may receive a score for each weight in a list of weights. For example, the list of weights may include weights from zero pounds to 200 pounds (or another upper limit of weight) at five-pound increments. The recommendation module 220 may access the user's profile and reduce the scores of weights that the user does not own to zero. The recommendation module may also reduce the scores of weights that do not align with the user's exercise goals or restrictions. For example, if the user's goal is "aerobic exercise," the recommendation module 220 may reduce the scores of weights that are over a third of the user's personal weight. The recommendation module 220 ranks the weights based on the scores and selects the highest-ranked weight to recommend to the user. The recommendation module 220 may similarly receive scores for one or more number of repetitions and/or number of sets from the weight recommendation model 230 and, after reducing one or more scores based on the user's profile, rank and select a number of repetitions and/or number of sets based on the ranking. The recommendation module 220 may send the recommendations to the user interface module 260 for display to a user or may send the selections to the workout plan module 200.

The workout plan module 200 receives the recommendations from the recommendation module 220 for each selected weight. The workout plan module 200 may determine an order for the exercises based on the ranking of exercises or may shuffle the exercises into an order randomly. The workout plan module 200 stores the order of exercises each associated with the received recommendations as a workout plan for the user in the exercise datastore 285. The workout plan may be stored in association with a current time/date and current performance statistics of the user in the exercise datastore 285. The workout plan module 200 send the workout plan to the user interface module 260 for display to the user. In some embodiments, the workout plan module 200 may receive indications from the user interface module 260 for each of the exercises in the workout plan indicating if the user completed the exercise using the recommendations or if the user modified the recommendations (e.g., performed another exercise, used a different weight, requested a different exercise, etc.). The workout plan module 200 stores a record of the indications in the exercise datastore 285 as part of the exercise history for the user.

In some embodiments, the user's exercise goals may indicate that they would like to perform exercises at their capability, or the user may request their capability for an exercise via the user interface module 260. In these embodiments, the capability module 240 may receive the request from the user interface module 260 or may receive an indication from the user interface module 260 that the user inputted an exercise goal of performing at their capability. The capability module 240 may determine a current capability of the user in performing one or more exercises in response to receiving the request or indication.

In some embodiments, if the user has not performed the exercise, the capability module 240 may input the user's profile to a machine learning model to determine the current capability of the user based on other user's capabilities. In other embodiments, the capability module 240 may use the capability of the user in performing other exercises to determine the user's current capability. For example, if the user has recently performed a bench-press and wants to know their current capability for a lateral press, the capability module 240 access a ratio for the two exercises (e.g., the bench-press and lateral press) stored in the exercise datastore 285. The capability module 240 applies the ratio to the capability of the user in performing the bench-press to determine the capability of the user in performing the lateral press. In further embodiments, the capability module 240 may calculate a moving average capability based on the user's exercise history if the user has performed the exercise before.

In particular, the capability module 240 accesses the exercise history of the user from the user profile datastore 290 to retrieve exercises performed by the user and a capability of the user each time the user performed the exercise. For example, the capability module 240 may retrieve exercise information indicating that the user has performed one bench-press using 150 pounds one week ago and one bench-press using 155 pounds one day ago. In some embodiments, the capability module 20 may only access the exercise history for one exercise specified by the request from the user and determine the user's capability for that exercise. Further, the capability module 240 may only access exercises of the exercise history performed within a recent time period (e.g., the last 180 days).

The capability module 240 partitions the exercise history into time periods. For instance, the capability module 240 may group exercises in the exercise history into one week time periods, one month time periods, or any other grouping of time. For each time period, the capability module 240 computes an aggregate capability of the user for each exercise based on the capability of the user when performing the exercise during the time period. The aggregate capability may be a sum, average, or another combination of the capability of the user for the exercise during the time period. For example, if the exercise history indicates that the user performed one bench-press using 150 pounds each day during the time period, the aggregate capability for the time period may be 150 pounds. Further, the capability module 240 may only average the capability for the exercise on days when the user performed the exercise and not include days where the user did not perform the exercise in computing the aggregate capability. The capability module 240 calculates a weighted moving average capability of the user based on the aggregate capabilities of the time period for each exercise. For instance, the capability module 240 may weight the aggregate capability of the most recent time period highest and the aggregate capability of the oldest time period the least.

The capability module 240 determines a current capability of the user for each exercise based on the moving average capability and a current time. In particular, the capability module 240 may use the moving average capability as the current capability or may apply exponential smoothing to the moving average capability to determine the current capability. However, if the current time is a threshold amount of time past the last time the user performed the exercise, the capability module 240 may discount the moving average capability based on how recently the user last performed the exercise. For instance, the capability module 240 may decay the moving average capability and may select a current capability from the decayed portion of the moving average capability if the user is performing the exercise more than a week (or another threshold time period) since the last performance of the exercise. The capability module 240 sends the selected current capability to the user interface module 250 for display and may store the current capability in the user's profile in the user profile datastore 290.

The training module 250 trains the exercise selection model 210 to rank a set of exercises of a user to perform based on the exercise history of the user, the gym equipment available to the user, and one or more exercise goals set by the user. In particular, the training module 250 may access the user profile datastore 290 to retrieve profiles of users. The training module 250 labels the exercise history of each user with the user's available exercise equipment, one or more exercise goals, and other aspects from the user's profile. The training module 250 stores the labeled exercise histories in the training datastore 295 as training data for the exercise selection model 210. In some embodiments, the training data may include training data for the exercise selection model 210 that was manually labeled by an external operator rather than the training module 250.

The training module 250 trains the exercise selection model 210 on the training data such that the exercise selection model 210 is configured to rank the set of exercises in the exercise datastore 285 upon receiving input of the user's profile, including the exercise history, available gym equipment, and exercise goals. In some embodiments, the exercise selection model 210 may comprise multiple machine learning models each trained for a particular user. In these embodiments, the training module 250 may train each machine learning model on training data specific to a user, and the workout plan module 200 may apply the machine learning model for the user. The training module 250 may train the exercise selection model 210 periodically as new users input profiles to the exercise recommendation system 100.

The training module 250 also trains the weight recommendation model 230 to determine a weight to recommend to a user for an exercise. The training module 250 accesses the exercise datastore 285 to retrieve a plurality of exercise pairs, which each includes two exercises. The training module 250 accesses the user profile datastore 270 to retrieve exercise histories of users and labels each exercise pair with performance statistics of users who completed both exercises of the pair. The performance statistics of the user include any weights used for exercises, number of repetitions of the exercises done by the user, and number of sets of the exercises done by the user, and, in some embodiments, each exercise in an exercise pair is associated with a particular weight and the exercise pair is labeled with the performance statistics of users who used the associated weight when performing the exercise. The training module 250 stores the labeled exercise pairs in the training datastore 295 as training data for the weight recommendation model 230.

The training module 250 trains the weight recommendation model 230 on the training data such that the weight recommendation model 230 is configured recommend a weight to a user for an exercise upon receiving performance statistics and the exercise. In some embodiments, weight recommendation model 230 may be further configured to determine a number of repetitions, number of sets, rest time between sets, interval time for each set, distance for an exercise (e.g., a mile, 100 meters, etc.), elevation, resistance, and/or resistance band tension to recommend to the user for the exercise. The training module 250 may train the weight recommendation model 230 periodically as more users complete exercises using the exercise recommendation system 100.

The training module 250 additionally trains a machine-learned strength prediction model on training data to enable the strength predictor module 275 to generate a predicted strength for the user at future times by applying the strength prediction model. As used herein, "predicted strength" includes a prediction at a future time for a user of a measure of strength of one or more muscles or muscle groups of the user, a prediction of a measure of performance of the user when performing one or more exercises, a number of reps or a maximum weight associated with a performance of one or more exercises, or any other measure of predicted ability. The training data set includes information describing characteristics of a population of users and historical performance data representative of a performance of exercises by the population of users over a period of time. The training data set may be created by collecting exercise information from wearable devices or mobile devices associated with a community of users of the exercise recommendation system 100. Using historical data to inform the prediction, the strength prediction model identifies correlations between characteristics of a user and performance data associated with the user and characteristics/performance data within the historical data to produce a measure of predicted strength for the user. The training module may retrain the strength prediction model periodically as the user and additional users complete exercises using the exercise recommendation system 100, by incorporating performance data from the user and additional users into the training data set used to retrain the strength prediction model. For instance, if a predicted measure of strength produced by the strength prediction model turns out to underestimate or overestimate an actual measure of the user's strength, the strength prediction model can be retrained using the actual measure of the user's strength to better predict measures of strength going forward.

The training module 250 trains an actual strength prediction module to predict an actual strength of a user at a future time. The actual strength of the user is a future measure of strength predicted based on the user's strength measurements, workout frequency, capability, and other performance factors within a given period of time. The actual strength reflects the user's predicted progression based on an assumption of the user continuing the patterns in their activity and diet routines collected over the last week, month, year, or other period of time. The training module 250 trains an actual strength prediction model using a training data set including characteristics of a population of users and historical performance data representative of a performance of exercises by the population of users. The training data may be collected through mobile devices and wearable devices associated with the population of users of the exercise recommendation system 100. Using historical data to inform the prediction, the actual strength prediction model identifies correlations between the user's characteristics and exercise data, including the user's frequency of performing workouts and capabilities in each workout performance over a set period of past time, and historical data. The actual strength prediction module identifies users in the population of users with a history of workout performances and frequencies similar to those of the user in the given time period. The actual strength prediction model generates a predicted measure of strength for the user, for instance based on a comparison of the user to strengths and capabilities of the identified users in the population of users similar to the user. The actual strength may be updated as the user performs more exercises and records their exercise performances. In some embodiments, the actual strength prediction model is retrained periodically as the user and additional users complete exercises using the exercise recommendation system 100, by incorporating performance data from the user and additional users into the training data set used to retrain the strength prediction model.

The user interface module 260 generates and transmits a user interface (or "interface") to one or more client devices 120 of users of the exercise recommendation system 100. The user interface may display exercises of workout plans determined by the workout plan module 200, recommended weights (or number of sets or repetitions) determined by the recommendation module 220, and capabilities determined by the capability module 240. The user interface may display interactive elements that allow a user to request a workout plan, recommendations, or a current capability for an exercise or indicate that they have completed an exercise or request a new exercise in the workout plan (such as by swiping away a presented exercise). For example, a user may indicate, via a sliding interactive element of the user interface, a selected level of variance for a workout plan. The user may also enter information for their profile and whether they completed one or more exercises via the user interface. The user interface module 260 may update the profile of a user in the user profile datastore 290 when a user adds or changes their information for their profile, such as by adding new exercise goals, rating exercises, and the like.

The user interface module 260 may display exercises for a workout plan to a user via the user interface. For instance, a user may input, via the user interface, a request for a workout plan. The request may be associated with a level of variance selected by the user on a sliding interactive element, which allows a user to configure how much variation from other workout plans the user would like for the workout plan. The user interface module 260 sends the request to the workout plan module 200, which determines a workout plan 200 to send back to the user interface module 260 for display to the user. In some embodiments, the user interface module 260 may send one exercise (and a weight, number of repetitions, and number of sets) at a time from the workout plan for display on the user interface, and upon receiving confirmation from the user via the user interface that the user performed the exercise, the user interface module 260 may update the user's exercise history in the user profile datastore 270. Further, the user interface module 260 may send an indication to the workout plan module 200 to redetermine the workout plan for the user given that the user performed the exercise or may send an indication that the user has requested a different exercise.

The user interface module 260 may receive requests for a recommended weight, number of sets, or number of repetitions from a user via the user interface. In particular, the user interface may display a plurality of exercises for the user to choose from, and upon receiving a selection, the user interface module 260 may send an indication of the exercise to the recommendation module 220. The user interface module 260 receives the recommendations from the recommendation module 220 and sends the recommendations for display via the user interface.

The user interface module 260 may also receive requests from a user for the user's capability for one or more exercises. The user interface module 260 may receive a request from the user interface for a current capability of the user for an exercise. The user interface module 260 sends the exercise to the capability module 240 to determine a capability of the user for the exercise. The capability of the user may be a weight for the exercise (e.g., the user can do one bench-press using 100 pounds) or a number of repetitions during a set (e.g., the user can do 32 pushups in one set). The user interface module 260 receives a capability of the user from the capability module 240 and displays the capability via the user interface.

Exercise Recommendation System Processes

Figure 3:
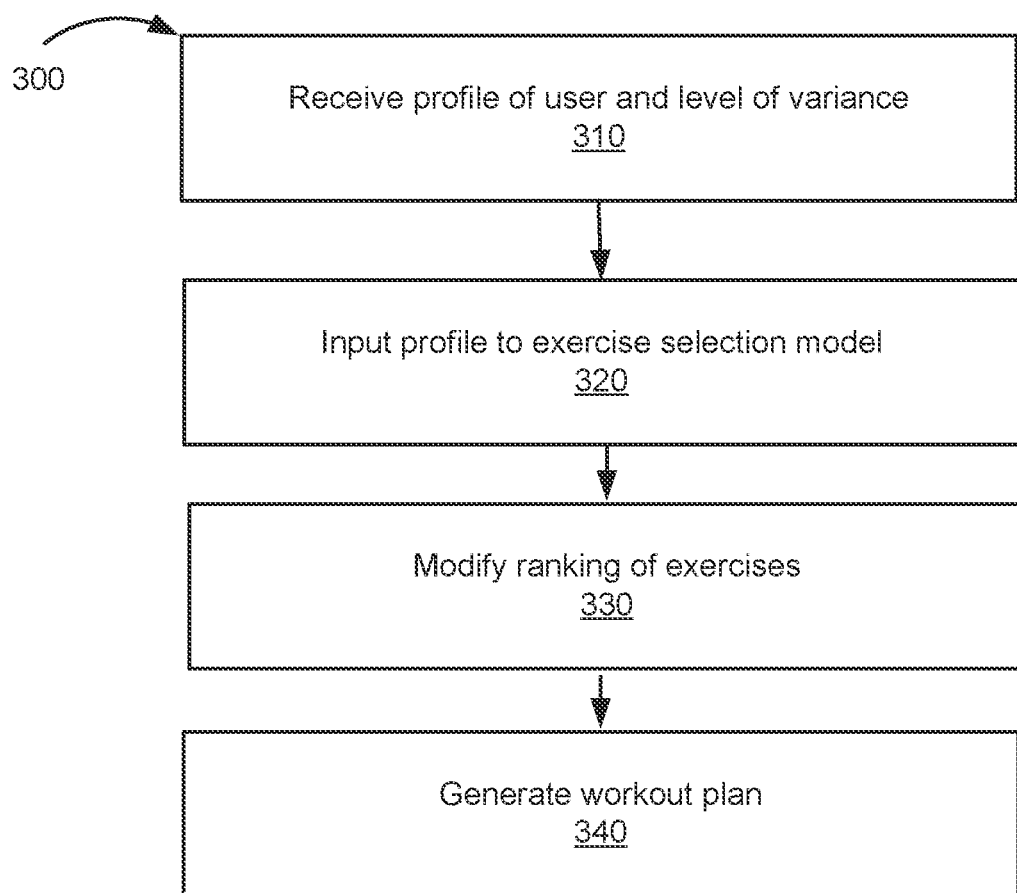
FIG. 3 is a flowchart illustrating a process for generating a workout plan, according to one embodiment.
Figure 4:
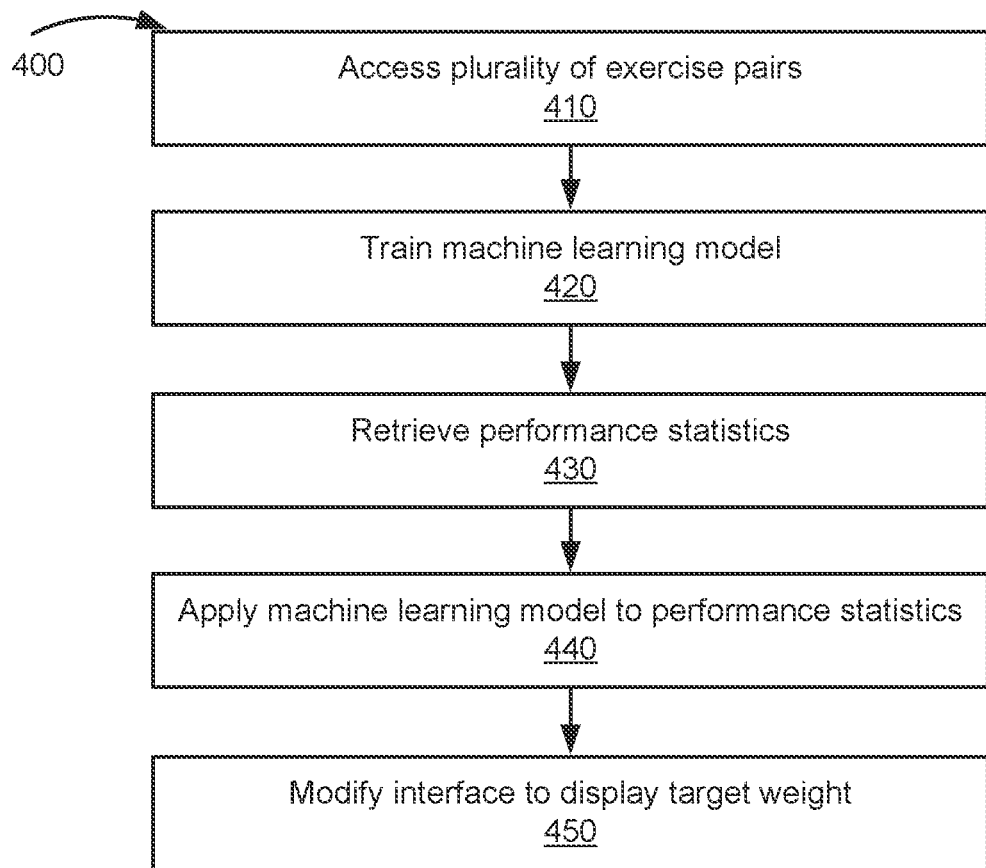
FIG. 4 is a flowchart illustrating a process for modifying an interface to display a target weight, according to one embodiment.
Figure 5:
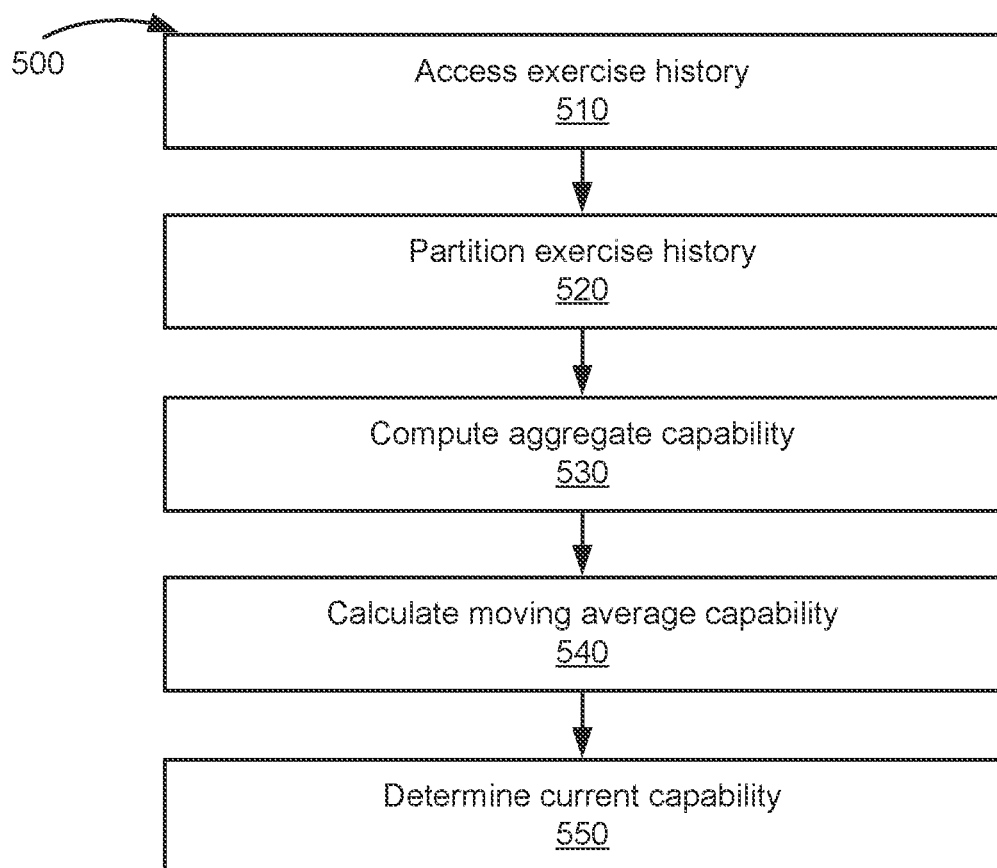
FIG. 5 is a flowchart illustrating a process for determining a current capability of a user, according to one embodiment.

FIGS. 3, 4, and 5 include flowchart illustrating processes (300, 400, and 500) performed by the exercise recommendation system 100. Though reference is made to engines, modules, and models of the exercise recommendation system 100 for these processes, the processes can be used by other online systems or mobile applications.

FIG. 3 illustrates a process 300 for generating a workout plan, according to one embodiment. The user interface module 250 receives 310 a profile of a user and a level of variance selected by the user via a user interface, both of which the user interface module 250 sends to the workout plan module 200 and/or stores in the user profile datastore 270. The workout plan module 200 inputs 320 the profile to the exercise selection model 210, and the exercise selection model 210 is configured to rank a set of exercises for a user to perform based on the user's profile. The set of exercises may be specific to the user or may be standard for the exercise recommendation system 100. The workout plan module 200 modifies 330 the ranking of exercises based on the profile and the level of variance. For instance, the workout plan module 200 may modify the ranking a greater amount for a first level of variance than for a second level of variance lower than the first level of variance. The workout plan module 200 generates 340 a workout plan for the user, where the workout plan comprises a threshold number of exercises selected based on the modified ranking.

It is appreciated that although FIG. 3 illustrates a number of interactions according to one embodiment, the precise interactions and/or order of interactions may vary in different embodiments. For example, in some embodiments, modifying the ranking comprises alerting scores of one or more exercise based on the user profile. In particular, the workout module 200 may reduce the scores of exercises that have low ratings from the user, that were recently performed by the user, that target muscle groups different from those specified in the user's exercise goals, that require equipment the user does not have, that conflict with physical ailments of the user, and the like. Further, the workout module 200 may increase the scores of exercises that target muscle groups specified by the user's exercise goals, that burn calories similar to a target set by the user, or the like. The workout module 200 may re-rank the exercises based on the altered scores and select exercises for the workout plan based on the new ranking.

FIG. 4 illustrates a process 400 for modifying a user interface to display a target weight. In particular, the recommendation module 220 accesses 410 a plurality of exercises pairs from the exercise datastore 280. Each exercise pair is labeled with performance statistics of users who have completed the exercises of the exercise pair. In some embodiments, each exercise pair may further be labeled based on muscle group capabilities, such as which muscle groups each exercise works. The training module 250 trains 420 a machine learning model (e.g., the weight recommendation model 230) using the plurality of exercise pairs. The machine learning model is configured to determine a weight to recommend to a user for a first exercise based on performance statistics associated with one or more second exercises, where each second exercise is within an exercise pair with the first exercise. In some embodiments, the machine learning model is further configured to determine a number of repetitions to recommend to the user for the first exercise based on the performance statistics of the user associated with the one or more second exercises.

The recommendation module 220 retrieves 430 performance statistics of a target user from the user profile datastore 270. The performance statistics may include a weight for each of one or more exercises previously performed by the target user, a weight of the user, a current muscle mass of the user, an average exercise time, a current capability of a user, and a number of repetitions for each of one or more exercises previously performed by the target user. The recommendation module 220 applies 440 the machine learning model to the performance statistics and a target exercise to determine a target weight to recommend to the target user for the target exercise. The recommendation module 220 modifies 450 the user interface displayed at a client device 120 of the target user to include the target weight determined by the machine learning model.

It is appreciated that although FIG. 4 illustrates a number of interactions according to one embodiment, the precise interactions and/or order of interactions may vary in different embodiments. For example, in some embodiments, responsive to receiving a request via the user interface for a target weight or target number of repetitions for an exercise, the recommendation module 220 applies the machine learning model to the performance statistics of the target user and the exercise to determine a target weight and/or target number of repetitions to recommend to the user for the exercise and modifies the user interface to include the target weight and/or target number of repetitions.

FIG. 5 illustrates a process 500 for determining a current capability of a user, according to one embodiment. The capability module 240 accesses 510 an exercise history for a user from the user profile datastore 270. The exercise history comprises one or more exercises performed by the user and a capability of the user each time the user performed the exercise. In some embodiments, the exercise history may further comprise information about exercises performed within a recent time period and, for each exercise in the exercise history, a number of sets performed by the user, a number of repetitions performed by the user for each set, and a weight used by the user.

The capability module 240 partitions 520 the exercise history into a plurality of time periods, and for each time period, the capability module 240 computes 530 an aggregate capability for each of the one or more exercises based on the capabilities of the user in performing each exercise during the time period. The capability module 240 calculates 540 a moving average capability of the user for each exercise based on the aggregate capabilities. In some embodiments, the capability module 240 may apply exponential smoothing to the moving average capability. The capability module 240 determines 550 the current capability of the user for each exercise based on the moving average capability, where the current capability of the user for each exercise is discounted at least in part based on how recently the user performed the exercise.

It is appreciated that although FIG. 5 illustrates a number of interactions according to one embodiment, the precise interactions and/or order of interactions may vary in different embodiments. For example, in some embodiments, responsive to determining that a threshold amount of time has passed since the user has exercised, the capability module 240 may decay the current capability of the user based on the threshold amount of time that has passed and use the decayed current capability as the current capability for the user. In other embodiments, the capability module 240 may modify a user interface of a client device 120 associated with the user to display the current capability responsive to receiving a request via the user interface for the current capability.

Workout Modification Based on User Feedback

Figure 6:
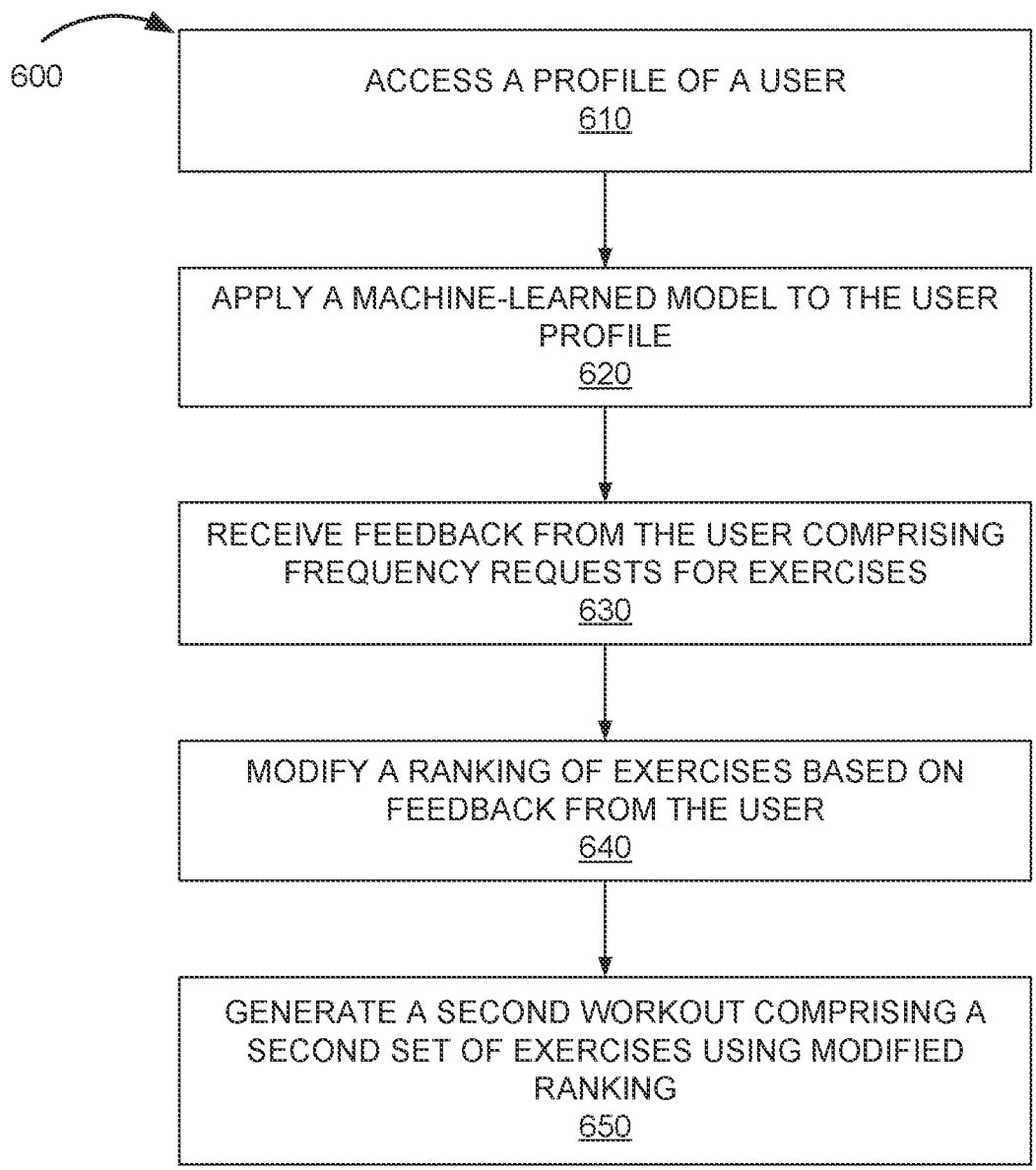
FIG. 6 is a flowchart illustrating a process for generating a workout plan based on user feedback, according to one embodiment.

A user of the exercise recommendation system 100 may want their exercise preferences to affect which exercises are recommended by the recommendation module 220. FIG. 6 is a flowchart illustrating a process 600 performed by the exercise recommendation system 100 to enable a user to alter rankings of exercises. The exercise recommendation system 100 accesses 610 a profile of a user from the user profile datastore 290. The profile may include information about the user including at least a history of exercises the user has performed, available gym equipment, and one or more exercise goals. The user may modify their available equipment based on what is available to them during a given workout. For example, on one day the user may be at the gym and on another day the user may be at home with less equipment. The user may input their goals for a single workout, a week of workouts, six months of workouts, or a longer period of time. The user's exercise goals that are tracked by the exercise recommendation system 100 are updated based on the user's input.

The exercise recommendation system 100 applies 620 a machine-learned model configured to generate a ranking of exercises for the user to perform, based on the user's characteristics, preferences, and workout history The ranking of exercises may be based on one or more of the user's history of exercises the user has performed, available gym equipment, one or more exercise goals, and feedback, preferences, and characteristics of other users. The machine-learned model may be trained by the training module 250 based on historical data for a plurality of users of the exercise recommendation system 100. The exercise recommendation system 100 generates a first workout for the user based on a ranking of exercises produced by the machine-learned model that includes a set of exercises for the user to perform. The set of exercises may be generated, at least in part, based on the ranking of the exercises. For example, the machine-learned model may randomly select a majority of exercises from a top percentage of ranked exercises, and may select some additional exercises from a lower ranked portion of the exercises.

The generated first workout for the user includes instructions to perform a first exercise from the set of exercises. The instructions may be displayed on a user interface, using the user interface module 260. The user may provide feedback in response to the first exercise. In some embodiments, the user may provide feedback after performing the exercise. Alternatively, the user may have the option to provide feedback upon display of the instructions. The exercise recommendation system 100 receives 630 the feedback from the user, which for example can include a request by the user to: perform the first exercise more frequently, perform the first exercise less frequently, or never perform the first exercise.

The user may provide feedback through a user interface provided by the user interface module 260. For example, the exercise recommendation system 100 may generate an application interface for the first workout. The application interface may include a first interface element corresponding to a request to perform a displayed exercise more frequently, a second interface element corresponding to a request to perform a displayed exercise less frequently, and a third interface element corresponding to a request to never perform the displayed exercise. For example, the interface elements may be buttons with symbolic representations for each user response. Alternatively, the interface elements may be buttons with words describing the effect of each, for example a button may read "Recommend this exercise (more/less/never)."

The exercise recommendation system 100 modifies 640 a ranking of exercises based on feedback from the user. If the user requested to perform the first exercise more frequently, the exercise recommendation system 100 increases the rank of the first exercise within the ranking of exercises. The exercise recommendation system 100 decreases the rank of the first exercise in response to user feedback comprising a request to perform the first exercise less frequently. If the user provides feedback requesting to never perform the first exercise, the exercise recommendation system 100 removes the first exercise from the ranking of exercises.

In some embodiments, the ranking of exercises is manually modified in response to user feedback, for instance by directly modifying the ranking to increase the ranking of an exercise, decrease the ranking of an exercise, or removing the exercise from the ranking. In other embodiments, the machine-learned model used to rank the exercises is retrained based on the feedback. For instance, the training data used to train the machine-learned model can be modified to increase a ranking of an exercise within the training data or decrease the ranking of the exercise within the training data, and then the machine-learned model can be retrained using the modified training data. The retrained machine-learned model can be configured to output a ranking of exercises that, for example, includes a lower ranking for an exercise that a user requested to perform less or never relative to the output of the initially trained machine-learned model, and that includes a higher ranking for an exercise that a user requested to perform more relative to the output of the initially trained machine-learned model.

The exercise recommendation system 100 generates 650 a second workout comprising a second set of exercises selected at least in part on the modified ranking of the exercises. The second workout may be displayed with instructions for the user to perform the second set of exercises. In response to the user requesting to perform the first exercise more frequently, the second workout is more likely to include the first exercise than the first workout. Likewise, the second workout is less likely to include the first exercise than the first workout in response to the user requesting to perform the first exercise less frequently.

The exercise recommendation system 100 may store user requests to perform exercises more frequently, less frequently, or to never perform certain exercises in the user profile datastore 290. In some embodiments, the exercise recommendation system 100 displays stored user requests previously made by the user for the user to modify. The user is able to modify the stored user requests by deleting past requests to perform an exercise more or less frequently, or to never perform the exercise. Additionally, the user may modify the user requests to change a request to perform an exercise more frequently to a request to perform the exercise less frequently, and vice versa. The user's modified requests are saved, replacing the user's old requests and may be further modified by the user.

Workout Modification Based on Muscle Strength Measurement Trends

Figure 7:
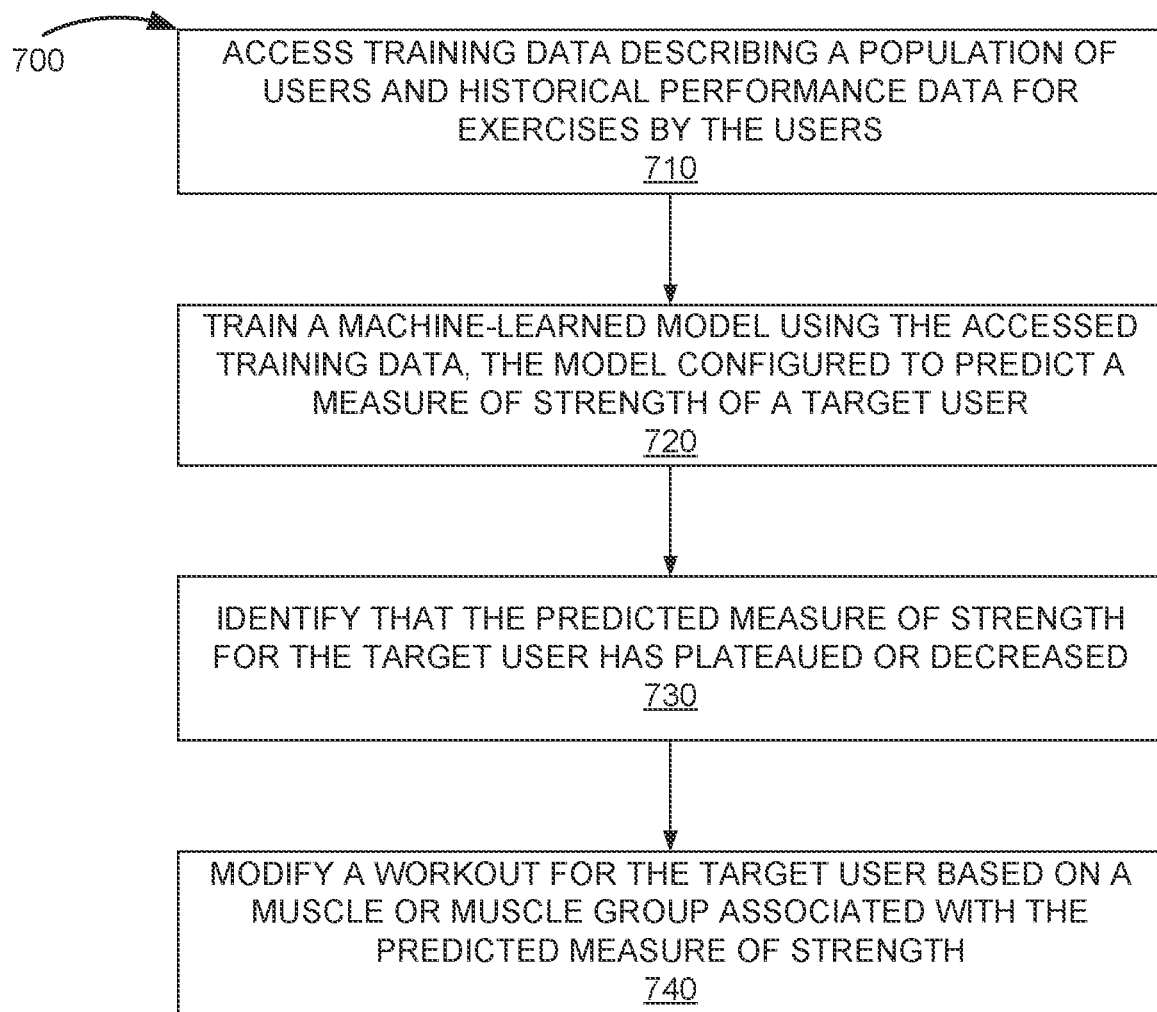
FIG. 7 is a flowchart illustrating a process for modifying a workout plan based on a predicted measure of strength, according to some embodiments.

FIG. 7 is a flowchart illustrating a process 700 performed by the exercise recommendation system 100. The exercise recommendation system 100 accesses 710 the training datastore 295 to retrieve training data describing a population of users and historical performance data for exercises by the population of users. The training data includes characteristics for the population of users from the user profile datastore 290. Characteristics include traits like age, height, weight, gender, and other information representative of or associated with users in the population of users.

Characteristics for a user may additionally include information such as the user's average time per workout, frequency of performing workouts, and exercise preferences. The historical performance data can include a measure of strength for the historical users when performing the exercises. For instance, a measure of strength for a historical user may be calculated based on repetitions and/or weights associated with the exercises performed by the historical users. The historical user's repetitions may include an average number of times the exercise was performed by the user in each workout where the user performed the exercise at least once. Alternatively, the historical user's repetitions may be a maximum number of times the exercise was performed in a single workout, or a trend in the maximum repetitions associated with the exercise (e.g., information representative of an increase in the maximum number of repetitions associated with the exercise when performed by the user over time).

A weight associated with the exercise performed by a historical user may be an averaged weight for each time the historical user performed the exercise. Alternatively, a weight associated with the exercise performed by a historical user may be a maximum weight that the historical user recorded during a performance of the exercise, or a trend in maximum weight associated with the exercise (e.g., information representative of an increase in the maximum weight associated with the exercise when performed by the user over time). The historical performance data may additionally include information representative of the user's capability with regards to one or more exercises.

The strength predictor module 275 includes a strength prediction model, which is a machine-learned model configured to predict a future measure of strength of a target user. The training module 250 trains 720 the strength prediction model with training data including information describing characteristics of a population of users and historical performance data for exercises by the population of users. The strength prediction model may determine correlations between historical performance data by the population of users and the strength measurements of the population of users. The correlations may be applied to the target user's characteristics and performance data to determine a strength measurement prediction. The strength prediction model generates predictions for the target user based on characteristics of the target user and data describing a performance of one or more exercises by the target user. The strength prediction model may be retrained based on an increase in the population of users of the exercise recommendation system 100 or based on added workouts and performance metrics. The term "target user" as used herein refers to a user to which the exercise recommendation system 100 applies one or more of the machine-learned models and/or functionalities described herein in order to make workout and exercise recommendations, and as described herein. The strength prediction model may be a classifier, decision tree, regression model, neural network, random forest model, or the like. The strength prediction model's generated predicted strength for the target user may show the target user's expected progress for strengthening a muscle or muscle group over time, as depicted in FIG. 8.

Figure 8:
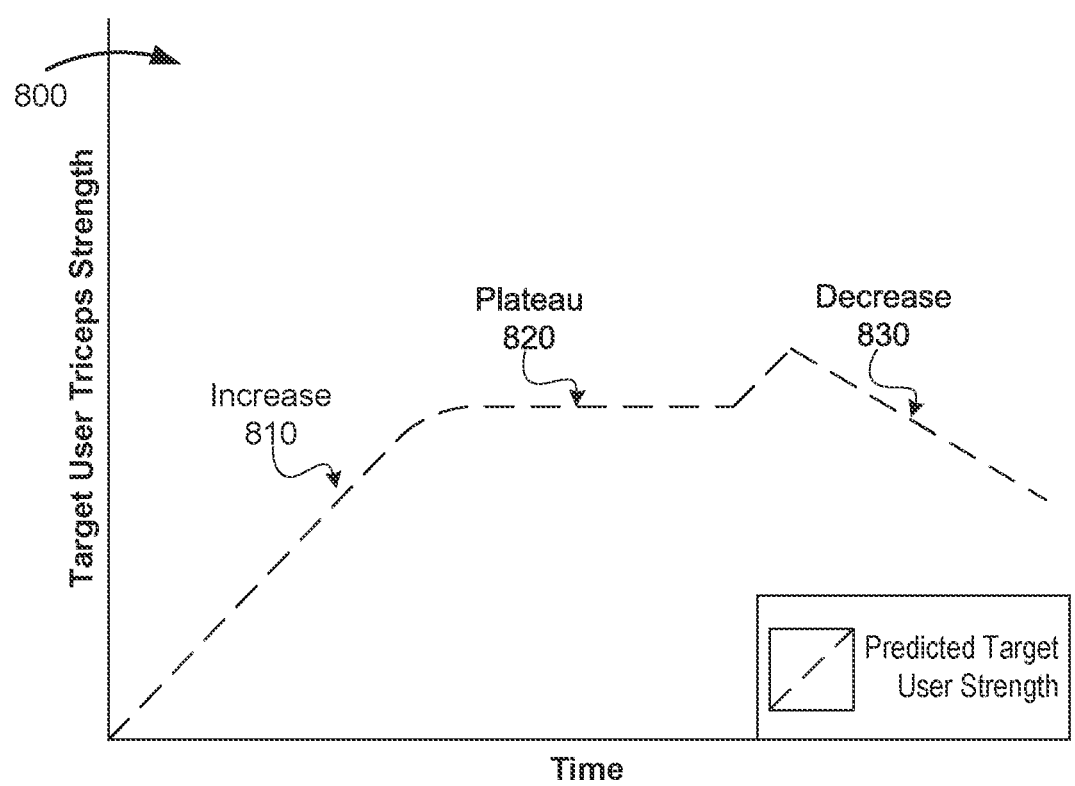
FIG. 8 is a graph depicting a predicted measure of strength for a target user, according to some embodiments.

FIG. 8 illustrates a predicted target user strength over time 800. In the example embodiment 800, the target user's triceps strength is predicted over time. The strength prediction model may generate the predicted target user strength and continuously update the prediction based on the target user's performance on exercises. The predicted target user strength may increase 810 over time if the user performs an exercise associated with a given muscle or muscle groups, such as triceps in the case of FIG. 8. If the user does not perform an exercise associated with the given muscle or muscle group for a predetermined period of time, the predicted user strength may start to plateau 820 or decrease 830 over time.

Similarly, if the user's capability (e.g., determined by the capability module 240) associated with the muscle or muscle group does not increase over a predetermined period of time, the predicted user strength may indicate a plateau 820. If the user's capability associated with the muscle or muscle group decreases, the predicted user strength may likewise be determined to decrease 830. In some embodiments, if a user's actual measure of strength (e.g., as determined by the strength measurement module 280, as described below) does not increase, or plateaus or decreases over time, the predicted user strength may likewise be determined to plateau or decrease over time.

In the process 700, the exercise recommendation system 100 identifies 730 that a predicted measure of strength for the target user has plateaued or decreased based on an output of the strength prediction model. The exercise recommendation system 100 identifies the plateau 820 or decrease 830 in predicted strength based on an output of the machine-learned strength prediction model. The plateau 820 may be identified based on the predicted target user strength increasing by less than a threshold amount over a set or threshold interval of time. For example, the plateau 820 may be identified if the target user's strength is projected to increase by less than a given percent over a week, month, year, or other interval of time. Likewise, a decrease 830 in the target user's predicted strength may be identified if the predicted strength of the target user decreases by more than a threshold amount over a set interval of time. For example, if the predicted target user's strength declines by greater than a threshold percentage over a week, month, year, or other interval of time.

The exercise recommendation system 100 modifies a workout for the target user based on a muscle or muscle group associated with the predicted measure of strength. The exercise ranking module 270 may increase the rankings of exercises associated with the muscle or muscle group that has a predicted plateau 820 or decrease 830. The exercise recommendation system 100 may generate a workout based partially on the modified rankings of exercises and preferentially select exercises with higher rankings or exercises associated with the muscle or muscle group associated with the predicted plateau 820 or decrease 830. Additionally, the exercise recommendation system 100 may manually add one or more exercises associated with the muscle or muscle group to the user's workout or to the user's subsequent workouts.

In some embodiments, the exercise recommendation system may add additional workouts associated with the muscle or muscle group, may replace workouts that were previously generated and that are associated with different muscles or muscle groups with workouts that are associated with the muscle or muscle group associated with the plateau 820 or decrease 830, may modifying previously generated workouts to replace exercises or include one or more additional exercises associated with the muscle or muscle group, may increase weights or repetitions of exercises associated with the muscle or muscle group, or may make recommendations to the user to performs exercises or complete workouts associated with the muscle or muscle group in any other suitable way.

Machine-Learned Strength Forecasting and Workout Recommendations

Figure 9:
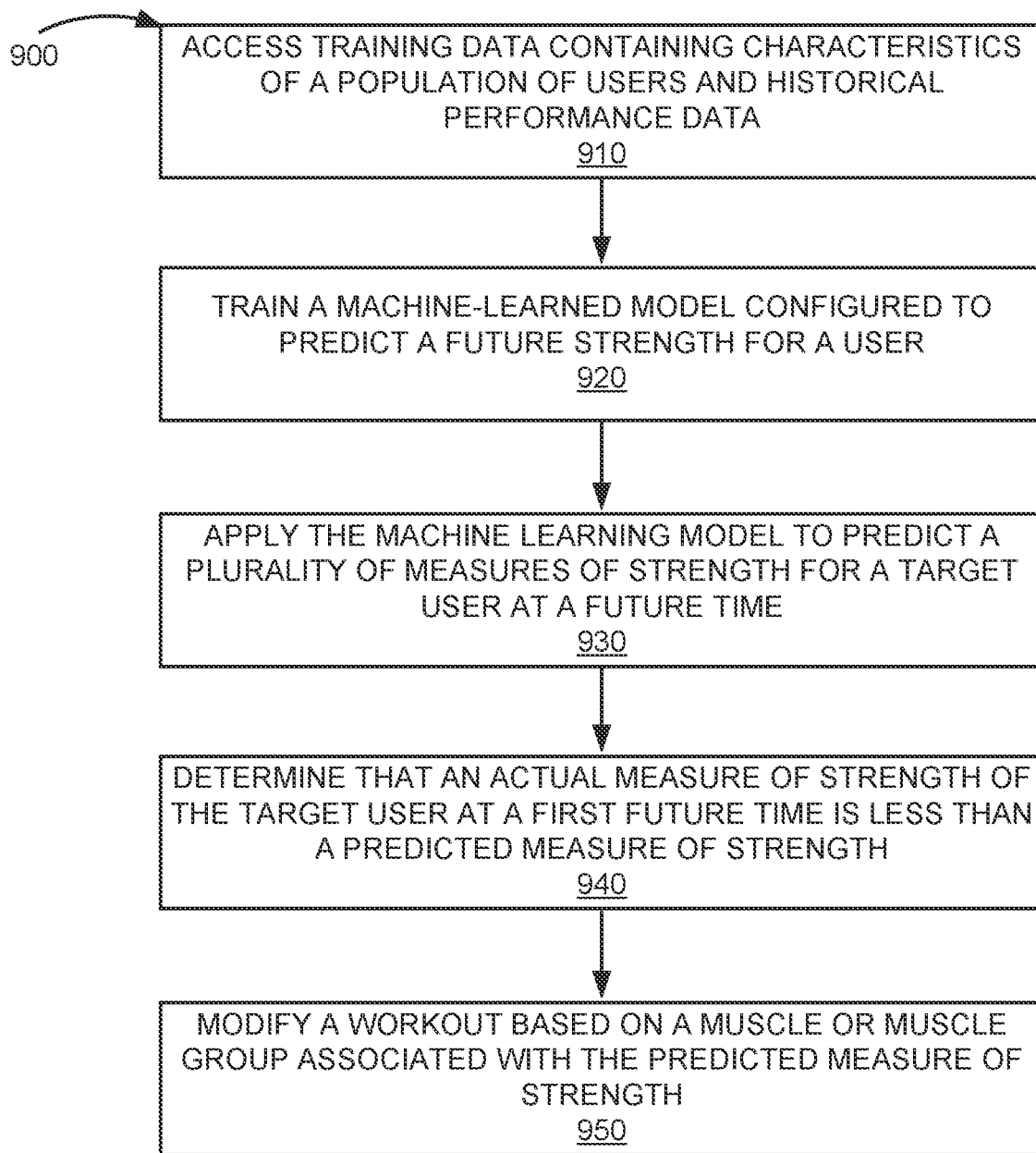
FIG. 9 is a flowchart illustrating a process for modifying a workout for a user based on an actual measure of strength and a predicted measure of strength, according to some embodiments.

The exercise recommendation system 100 may forecast the strength for a muscle or muscle group of a user at one or more future times. FIG. 9 is a flowchart illustrating a process for modifying a workout for a user based on an actual measure of strength and a predicted measure of strength, according to some embodiments. In the embodiment of FIG. 9, the exercise recommendation system 100 uses a process 900 to predict and compare measures of strength for a target user at a future time, according to some embodiments.

To predict a measure of strength, the exercise recommendation system 100 accesses 910 training data describing characteristics of a population of users and historical performance data for the population of users. The population of users includes a plurality of users with profiles in the user profile datastore 290. Characteristics of each user may include a history of exercises performed by the user and a time since the last performance of the exercise. The characteristics for each user may additionally contain one or more of: a frequency that a user performs an exercise, a frequency that a user exercises a muscle or muscle group, strength trends and progress for the user, upcoming exercises in a workout plan, historical strength scores, maximum weight single repetition exercises that a user can perform, community results based on a population of people with one or more characteristics in common with the user, demographic information associated with the user, and health metric information associated with the user. Health metrics may include at least the user's height, weight, age, and any health ailments the user provides. The population of users associated with the training data may be tailored based on having a common quality with the target user. In one example, the population of users may preferentially contain users with a gender, age, height, and weight within a margin of similarity to the target user. The population of users may preferentially contain users with a similar frequency and type of workouts, in some embodiments.

The training data accessed 910 by the exercise recommendation system 100 includes historical performance data representative of a performance of exercises by the population of users. The historical performance data may be representative of a measure of strength of users in the population of users over time. The performance data may be for a specific muscle or muscle group of the user, such as triceps or abdominal muscles. The performance data may be selected from a set period of time, such as six months or one year. In some embodiments, the performance data may be selected over a set number of workouts or exercises performed. For example, the performance data may contain data representing the strength of the user over a course of performing 5, 20, 100, or more workouts.

The exercise recommendation system 100 trains 920 a machine-learned model configured to predict a future strength for a target user. The exercise recommendation system 100 uses the accessed 910 training data including information describing characteristics of a population of users and historical performance data representative of the performance of exercises by the population of users to train the machine-learned model. The machine-learned model may be a classifier, decision tree, regression model, neural network, random forest model, or the like. The machine learning model is applied to characteristics of the target user from the user profile datastore 290. Characteristics may include the target user's height, weight, age, frequency of workouts performed, goals, workout preferences, and other traits in the target user's profile. The machine-learned model may also be applied to data describing a performance of one or more exercises by the target user. The data describing the performance of one or more exercises by the target user may be from the target user's profile in the user profile datastore 290. The performance data may also be manually inputted by the target user. The data may include calculated capabilities for the target user from the capability module 240.

Figure 10:
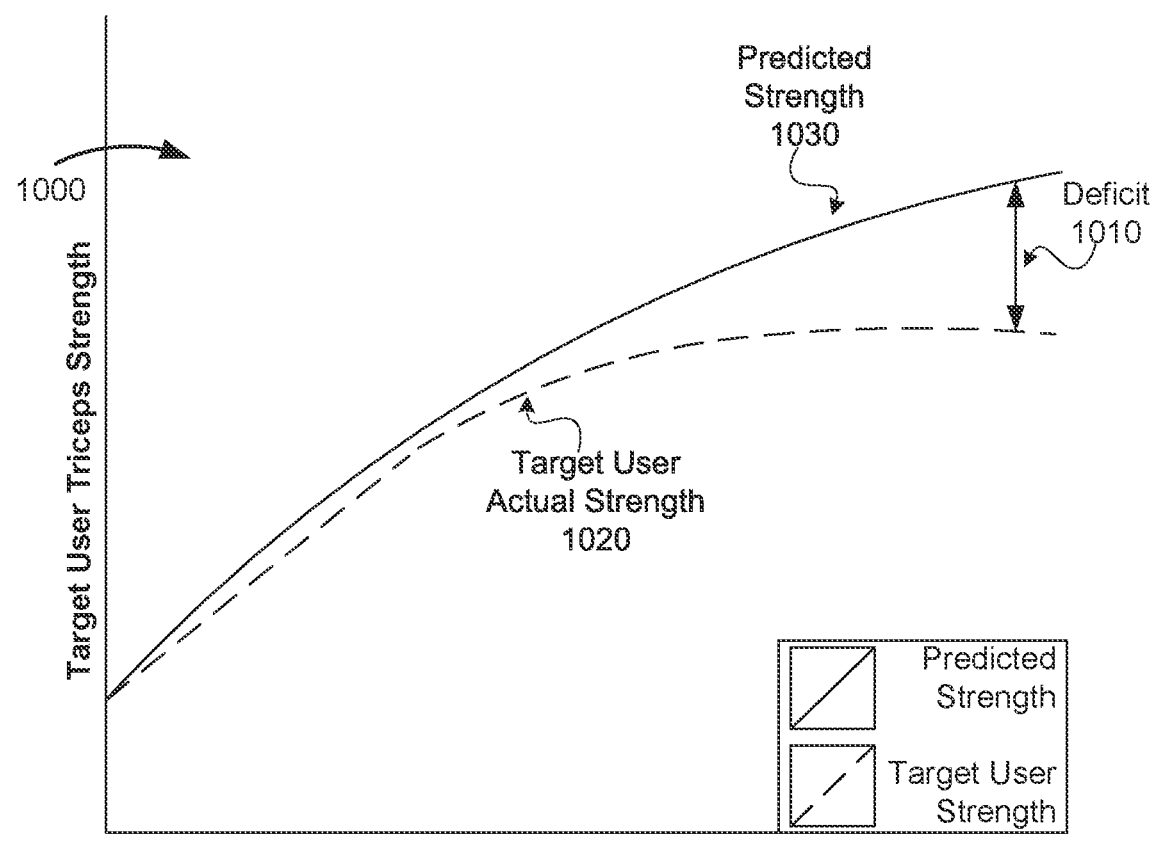
FIG. 10 is a graph depicting a predicted strength and an actual target user strength, according to some embodiments.

The exercise recommendation system 100 applies 930 the machine-learned model to predict a future measure of strength for the target user based on the user's characteristics and performance data. The machine-learned model predicts measures of strength of the target user at a one or more future times. For example, the machine-learned model may predict that the target user will be 10% stronger in one week, one month, six months, or another future time. Referring to FIG. 10, the machine-learned model generates the predicted strength 1030 for the target user. In the example 1000 illustrated by FIG. 10, the target user's triceps strength is predicted over time. The predicted strength 1030 may be displayed within an application interface of a user device for the user's reference. The predicted strength 1030 may be displayed as a trendline, as illustrated in FIG. 10.

The exercise recommendation system 100 determines 940 that an actual measure of strength of the target user at a first future time is less than a predicted measure of strength of the target user corresponding to the first future time. The strength measurement module 280 provides a continuously updating measure of the target user's actual strength 1020, as depicted in FIG. 10. The strength measurement module 280 may update the target user's actual strength 1020 based on the target user's performance of an exercise, a change in the target user's frequency of performing exercises, and changes in the target user's profile in the user profile datastore 290. The actual target user strength 1020 may be displayed on an application interface for the user to view. As illustrated in FIG. 10, the application interface may include an overlay with several trendlines including a plurality of future times. The overlay includes an overlay of the target user's actual strength 1020 and predicted strength 1030 over time, in accordance with some embodiments. The overlay may include trendlines corresponding to average predicted measures of strength associated with one or more community members so that the target may see a community-averaged predicted measure of strength to compare against their strength. The exercise recommendation module 100 may determine the presence of a deficit 1010 between the target user's predicted strength 1030 and actual strength 1020.

The exercise recommendation system 100 modifies 950 a workout for the target user based on a muscle or muscle group associated with the predicted measure of strength. Based on determining a deficit 1010 between the target user's predicted strength 1030 and actual strength 1020, the exercise recommendation system 100 modifies 950 the workout to add exercise associated with the muscle or muscle group associated with the deficit 1010. In some embodiments, the exercise recommendation system 100 may add additional workouts associated with the muscle or muscle group. Alternatively, the exercise recommendation system 100 may replace workouts that were previously generated and that are associated with different muscles or muscle groups with workouts that are associated with the muscle or muscle group associated with the deficit 1010. In the example illustrated by FIG. 10, the exercise recommendation system 100 may preferentially recommend triceps workouts, for example. The exercise recommendation system may additionally increase weights or repetitions of exercises associated with the muscle or muscle group or make recommendations to the user to perform exercises or complete workouts associated with the muscle or muscle group in any other suitable way.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In one embodiment, a software engine is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for generating a workout plan, the method comprising:
    accessing a profile of a user, the profile including a history of exercises the user has performed, available gym equipment, and one or more exercise goals;
    applying a trained machine-learned model to the accessed profile, the machine-learned model configured to 1) generate a first ranking of exercises for a user to perform based on the history of exercises the user has performed, the available gym equipment, the one or more exercise goals, a level of variance determined based on the history of exercises and 2) generate a first workout comprising a set of exercises selected based at least in part on the first ranking of the exercises;
    in response to instructing the user to perform a first exercise from the set of exercises, receiving feedback from the user comprising a request to: perform the first exercise more frequently, perform the first exercise less frequently, or never perform the first exercise;
    modifying training data used to train the machine-learned model based on the feedback from the user by:
        increasing the rank of the first exercise within the training data in response to the feedback comprising a request to perform the first exercise more frequently;
        decreasing the rank of the first exercise within the training data in response to the feedback comprising a request to perform the first exercise less frequently; and
        removing the first exercise from the training data in response to the feedback comprising a request to never perform the first exercise;
    retraining the machine-learned model on the modified training data, wherein the machine-learned model is configured to output a second ranking of exercises that accounts for the feedback relative to the first ranking;
    receiving a second level of variance specified via a sliding interactive element presented at a user interface, wherein the second level of variance is a percentage that represents variety in exercise type, exercise, workout length, and focused muscle group for a second workout; and
    generating, using the machine-learned model, the second workout by:
        generating, by the machine-learned model, a second ranking of exercises for the second workout;
        selecting the percentage of the second level of variance from the set of exercises;
        increasing the rankings of the selected exercises; and
        generating the second workout comprising a second set of exercises selected at least in part on the second ranking of the exercises.

2. The method of claim 1, wherein generating the second workout further comprises:
    displaying the second workout with instructions for the user to perform the second set of exercises in the second workout.

3. The method of claim 1, further comprising:
    generating an application interface for the first workout, the application interface including a first interface element corresponding to a request to perform a displayed exercise more frequently, a second interface element corresponding to a request to perform a displayed exercise less frequently, and a third interface element corresponding to a request to never perform the displayed exercise.

4. The method of claim 1, wherein the second workout is more likely to include the first exercise than the first workout in response to the user requesting to perform the first exercise more frequently.

5. The method of claim 1, wherein the second workout is less likely to include the first exercise than the first workout in response to the user requesting to perform the first exercise less frequently.

6. The method of claim 1, further comprising:
    storing user requests to perform exercises more frequently, to perform exercises less frequently, or to never perform exercises; and
    displaying stored user requests for the user to modify.

7. A system for generating a workout plan comprising:
    at least one processor; and
    at least one memory comprising stored instructions, the instructions when executed by the at least one processor configured to cause the at least one processor to:
        access a profile of a user, the profile including a history of exercises the user has performed, available gym equipment, and one or more exercise goals;
        apply a trained machine-learned model to the accessed profile, the machine-learned model configured to 1) generate a first ranking of exercises for a user to perform based on the history of exercises the user has performed, the available gym equipment, the one or more exercise goals, a level of variance determined based on the history of exercises and 2) generate a first workout comprising a set of exercises selected based at least in part on the ranking of the exercises;
        in response to instructing the user to perform a first exercise from the set of exercises, receive feedback from the user comprising a request to:
            perform the first exercise more frequently, perform the first exercise less frequently, or never perform the first exercise;
        modify training data used to train the machine-learned model based on the feedback from the user by:
            increasing the rank of the first exercise within the training data in response to the feedback comprising a request to perform the first exercise more frequently;
            decreasing the rank of the first exercise within the training data in response to the feedback comprising a request to perform the first exercise less frequently; and
            removing the first exercise from the training data in response to the feedback comprising a request to never perform the first exercise;
        retrain the machine-learned model on the modified training data, wherein the machine-learned model is configured to output a second ranking of exercises that accounts for the feedback relative to the first ranking;

receive a second level of variance specified via a sliding interactive element presented at a user interface, wherein the second level of variance is a percentage that represents variety in exercise type, exercise, workout length, and focused muscle group for a second workout; and generate, using the machine-learned model, the second workout by:
generating, by the machine-learned model, a second ranking of exercises for the second workout;
selecting the percentage of the second level of variance from the set of exercises;
increasing the rankings of the selected exercises; and
generating the second workout comprising a second set of exercises selected at least in part on the second ranking of the exercises.

8. The system of claim 7, wherein generating the second workout further comprises:
displaying the second workout with instructions for the user to perform the second set of exercises in the second workout.

9. The system of claim 7, wherein the instructions cause the at least one processor to perform further steps comprising:
generating an application interface for the first workout, the application interface including a first interface element corresponding to a request to perform a displayed exercise more frequently, a second interface element corresponding to a request to perform a displayed exercise less frequently, and a third interface element corresponding to a request to never perform the displayed exercise.

10. The system of claim 7, wherein the second workout is more likely to include the first exercise than the first workout in response to the user requesting to perform the first exercise more frequently.

11. The system of claim 7, wherein the second workout is less likely to include the first exercise than the first workout in response to the user requesting to perform the first exercise less frequently.

12. The system of claim 7, wherein the instructions cause the at least one processor to perform further steps comprising:
storing user requests to perform exercises more frequently, to perform exercises less frequently, or to never perform exercises; and
displaying stored user requests for the user to modify.

13. A non-transitory computer readable medium having instructions for generating a workout plan encoded thereon that, when executed by a processor, cause the processor to:
access a profile of a user, the profile including a history of exercises the user has performed, available gym equipment, and one or more exercise goals;
apply a trained machine-learned model to the accessed profile, the machine-learned model configured to 1) generate a first ranking of exercises for a user to perform based on the history of exercises the user has performed, the available gym equipment, the one or more exercise goals, a level of variance determined based on the history of exercises and 2) generate a first workout comprising a set of exercises selected based at least in part on the ranking of the exercises;
in response to instructing the user to perform a first exercise from the set of exercises, receive feedback from the user comprising a request to: perform the first exercise more frequently, perform the first exercise less frequently, or never perform the first exercise;

modify training data used to train the machine-learned model based on the feedback from the user by:
increasing the rank of the first exercise within the training data in response to the feedback comprising a request to perform the first exercise more frequently;
decreasing the rank of the first exercise within the training data in response to the feedback comprising a request to perform the first exercise less frequently; and
removing the first exercise from the training data in response to the feedback comprising a request to never perform the first exercise;
retrain the machine-learned model on the modified training data, wherein the machine-learned model is configured to output a second ranking of exercises that accounts for the feedback relative to the first ranking; and
receive a second level of variance specified via a sliding interactive element presented at a user interface, wherein the second level of variance is a percentage that represents variety in exercise type, exercise, workout length, and focused muscle group for a second workout; and
generate, using the machine-learned model, the second workout by:
generating, by the machine-learned model, a second ranking of exercises for the second workout;
selecting the percentage of the second level of variance from the set of exercises;
increasing the rankings of the selected exercises; and
generating the second workout comprising a second set of exercises selected at least in part on the second ranking of the exercises.

14. The non-transitory computer readable medium of claim 13, wherein generating the second workout further comprises:
displaying the second workout with instructions for the user to perform the second set of exercises in the second workout.

15. The non-transitory computer readable medium of claim 13, wherein the instructions cause the processor to perform further steps comprising:
generating an application interface for the first workout, the application interface including a first interface element corresponding to a request to perform a displayed exercise more frequently, a second interface element corresponding to a request to perform a displayed exercise less frequently, and a third interface element corresponding to a request to never perform the displayed exercise.

16. The non-transitory computer readable medium of claim 13, wherein the second workout is more likely to include the first exercise than the first workout in response to the user requesting to perform the first exercise more frequently.

17. The non-transitory computer readable medium of claim 13, wherein the second workout is less likely to include the first exercise than the first workout in response to the user requesting to perform the first exercise less frequently.

18. The non-transitory computer readable medium of claim 13, further comprising:
accessing a history of workout performances for a population of users, wherein the history includes a strength measurement for and characteristics of each user, the strength measurement determined based on repetitions and weights associated with exercises performed by the users;

training a second machine-learned model to predict strength, the second machine-learned model trained on the history of workout performances;

generating a strength prediction for the user by applying the second machine-learned model to characteristics of the user and the exercises in the second workout; and causing the user interface to display the strength prediction and one or more exercises of the second workout.

19. The non-transitory computer readable medium of claim 13, wherein increasing the rankings of the selected exercises results in a third ranking, further comprising:

retraining the machine-learned model based on the third ranking.

* * * * *